DONALD E. LOVELACE
INVENTOR.

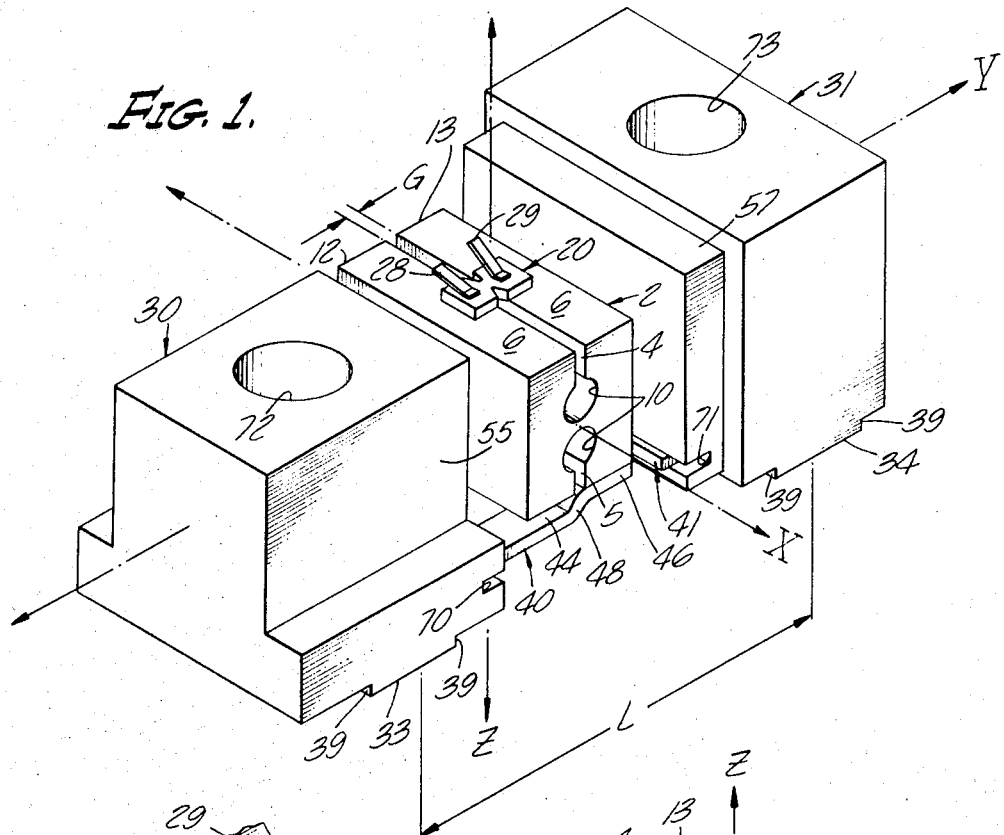

BY
ATTORNEY

United States Patent Office 3,444,499
Patented May 13, 1969

---

3,444,499
STRAIN GAUGE
Donald E. Lovelace, Los Angeles, Calif., assignor to Endevco Corporation, Pasadena, Calif., a corporation of California
Filed Jan. 16, 1967, Ser. No. 609,553
Int. Cl. G01l 1/22
U.S. Cl. 338—2                  14 Claims

ABSTRACT OF THE DISCLOSURE

Strain across a pair of widely spaced points of a test object is transferred to a short piezoresistive strain sensing element. The strain occurring between points on the test object is transmitted through leaf springs to a flexural slotted rectangular lever block. The relative displacement of the faces of two slots in the block is detected by displacement sensors bonded to transverse surfaces at the ends of the slots. The gauge may be bolted or glued in place. Strains of the order of microinches per inch are easily detected.

CROSS REFERENCES TO RELATED APPLICATIONS

Patent application Ser. No. 377,984 filed: June 25, 1964, now Patent No. 3,363,471.
Patent application Ser. No. 421,869 filed: Dec. 29, 1964.
Patent application Ser. No. 599,334 filed: Oct. 26, 1966, now Patent No. 3,351,880.

This invention relates to an improved strain gauge which is capable of effectively measuring micro-strains. The strain gauge of this invention is very sensitive and is easy to install, is relatively rugged, and is very suitable for operational as distinguished from laboratory use.

Strain gauges have been used extensively in stress analysis for structural and machine parts. Accurate strain measurement is often necessary, especially in cases involving limit design with low safety factors. In general, two principal types of strain gauges have been employed in the prior art to measure strain.

The first principal type includes mechanical indicators such as the Tuckerman extensometer and later, optical versions of the same device. In this type of instrument, fixed and movable knife edges form small notches in the stress member as the instrument is clamped on, fixing the gauge length. Elongation of the member is transmitted from the notches through the knife edges to a lever type multiplying and indicating mechanism. In later forms of this instrument, a mirror is moved to deflect a light beam through an optical lever system. Some of the disadvantages of these early mechanical strain gauge mechanisms were:

(1) Sensitivity was limited by the usable lever ratio, being limited largely because hysteresis and lost motion increase with mechanical multiplication.

(2) Slippage of knife edges in their notches was often possible, especially when the test specimen was very soft or very hard.

(3) They were not suitable for permanent or operational use, such as using the gauge to measure strain in the hammer of a press for an indefinite period to insure similar compression and consistency of articles pressed.

The second principal type of strain gauges known in the prior art includes wire and foil glue-down type gauges. These gauges have been more recently developed and are a more accurate means of measuring strain. They have been under development for over twenty years and exist in a wide variety of shapes and sizes for many applications. Operation depends upon a change of resistance in the gauge filament caused largely by physical distortion. The device is glued directly to the measured member and is subjected to the same elongation as that portion of the measured member to which it is attached. Disadvantages of these wire and foil glue-down type gauges include:

(1) The electrical output is low because of low gauge factor.

(2) They are vulnerable to damage unless protected by their location or by external housings.

(3) Temperature compensation requires extra circuit components or multiple gauges.

(4) Installation procedure is comparatively lengthy.

In the best embodiment of this invention now known, an improved strain gauge is provided which overcomes the foregoing disadvantages and in particular:

(1) is very sensitive;
(2) has high electrical output;
(3) is suitable for operational use;
(4) is portable;
(5) is rugged; and
(6) is easily installed.

Strain gauges of the prior art operated essentially by attaching a gauge to an object under consideration and subjecting it to strain to the same extent as the object undergoing test. The "gauge length" of these strain gauges was the same as the "strain summation length" over which the gauges were acting. The term "strain summation length" represents the distance in the object under consideration across which the gauges are attached.

In the present invention the strain which occurs across the strain summation length in the object under consideration is summed and measured across a much smaller distance, partially accounting for very high sensitivity. In the best embodiment of the invention now known, resilient mechanical means are employed to transfer the summed strain to a lever block or flexure member upon which are mounted piezoresistive semiconductor elements sensitive to relative motion of wing or lever members. The net effect of this configuration is to allow the total strain which has been summed to be applied over a much smaller actual gauge length distance, thus attaining mechanical multiplication, or amplification.

Another factor contributing to the high sensitivity is the fact that the piezoresistive elements used to measure relative motion of the members of the lever block are more sensitive to strain than the traditional types of metal wire or foil used in conventional strain gauges. The piezoresistive elements, which are of the type described and claimed in U.S. Patent No. 3,351,880, are highly sensitive for two reasons. The first reason involves the geometrical configuration or shape. The piezoresistive element is shaped into an hourglass configuration with a narrow neck. The strain felt across the length of the neck of the piezoresistive element is thereby concentrated in the narrowest portion of the element, thus further amplifying the strain mechanically. The second reason is that the material used in these piezoresistive elements is semiconductive whereby they have a higher gauge factor, i.e., exhibit a greater change in resistance per unit of strain than metal wire or foil.

The strain gauge of this invention is especially suitable for operational use. The term "operational use" refers to a use whereby the strain gauge is utilized to record periodic or other changing strains for purposes such as monitoring the amount of stress in a given element or monitoring a strain in an element to insure a uniformity of stress occurring in that element over a period of time. In the best embodiment of this invention now known, operational use is facilitated by the fact that the gauge is small enough and rugged enough to be quickly, readily, permanently, and reliably mounted under a wide variety of conditions.

A protective covering is employed to facilitate outdoor or any other use in which it is desirable to protect the interior parts of the gauge.

In the best embodiment now known, the strain gauge is installed without gluing. Whereas in the glue-down wire and foil gauges of the prior art there was a prolonged delay in installation due to the necessity of waiting for the mounting glue to dry; in the best embodiment of the present invention, the strain gauge is adapted to be bolted into place and used immediately.

A serious problem with many gauges known in the prior art was that of compensating for thermal strains. In the best embodiment of this invention the strain gauge is partially thermally compensated by the selection of materials having coefficients of thermal expansion such that thermal strains caused by the configuration of the parts of the strain gauge are minimized.

Thus, in accordance with this invention, a strain gauge is provided which is extremely sensitive, suitable for operational use, relatively rugged, temperature stable, and easily installed.

The foregoing and other features of this invention, together with the various advantages thereof, will be understood more fully from a reading of the following specification taken in connection with the accompanying drawings.

In the drawings:

FIGURE 1 is an isometric representation of one embodiment of this invention;

FIG. 2 is an isometric representation of a lever block as employed in one embodiment of this invention;

FIG. 6 is an isometric view of a typical piezoresistive displacement sensor employed in one form of the invention; and FIG. 7 is a schematic diagram employed to explain the effect of bending.

Figure 3:
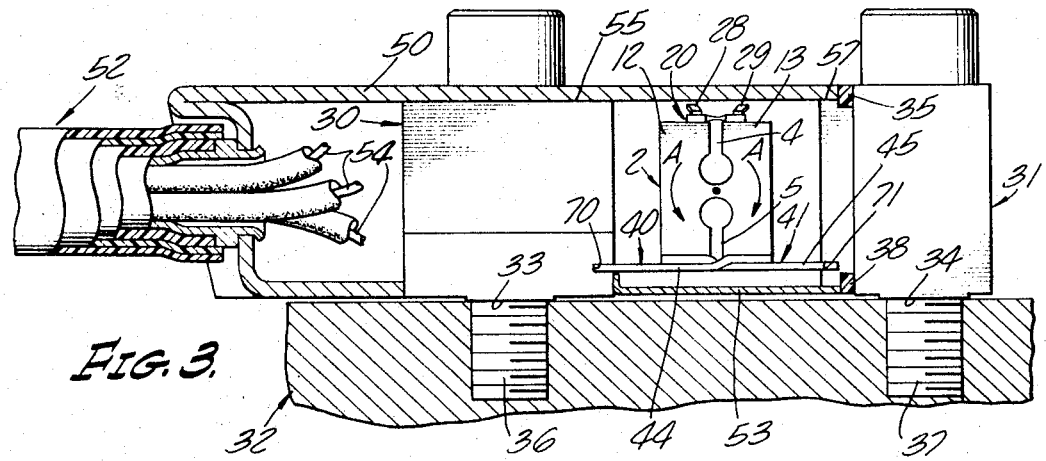
FIG. 3 is a partially cut-away side view of the strain gauge according to this invention.

The strain gauge will be described as though mounted on a flat horizontal surface subject to a simple strain along a horizontal axis.

The embodiment of the invention illustrated in FIGS. 1, 2, 3, and 4 operates essentially in the following manner:

(1) The support members 30 and 31 (also referred to as stanchions), which are attached to an object 32 (see FIG. 3) under consideration at the mounting surfaces 33 and 34, move along the longitudinal axis Y (also referred to as the direction of strain) relative to each other as strain occurs in the object under consideration;

(2) Motion of the stanchions 30 and 31 is transferred to the two members 12 and 13 of the lever block, or flexure member, 2, by means of flexible springs 40 and 41;

(3) The members 12 and 13, also referred to as wing members, of the lever block 2 tend to rotate in opposite directions about the hinge axis which in this figure corresponds to the X—X axis;

(4) The opposing faces of the slots 4 and 5 move relative to each other. This motion is sensed by displacement sensors 20 (see FIGS. 1, 2, and 3) and 21 (see FIG. 4) which are connected to members 12 and 13 in such a manner as to couple the wings across each of the slots 4 and 5;

(5) As the faces of the slots are displaced in a direction parallel to the longitudinal or strain axis Y—Y, one of the displacement sensors 20 and 21 is elongated while the other is compressed, with their resistances increasing and decreasing respectively;

(6) The change in resistance of the displacement sensors is indicative of the strain in the object under consideration both as to amount and sign.

In one specific embodiment of the strain gauge of this invention, a lever block 2, as shown in FIGS. 1 and 2, is employed which is in the shape of a slotted rectangular parallelepiped. The three principal axes of the lever block have been identified in FIG. 1, with the axis of rotation, or hinge axis, X—X taken through the width, the strain axis Y—Y taken through the length, and the neutral axis Z—Z taken through the height. As previously indicated, the axis Y—Y in FIG. 1 corresponds to the direction of strain. The term "rotation" refers to the fact that parts of the lever block, called wings, flex or rotate about a horizontal axis X—X when the gauge is subjected to strain along the strain axis Y—Y.

Though the lever block 2 may be formed other ways, in the lever block illustrated, the slots 4 and 5 are cut along a common plane perpendicular to the direction of strain. The lever block 2 comprises two members, or wings, 12 and 13 which are separated by coplanar slots 4 and 5. FIG. 2 shows a view with one member 12 partially cut away. The two members 12 and 13 are connected along a flexure axis or hinge axis 14, which is adjacent the slots 4 and 5 and which coincides with the axis of rotation X—X.

One slot 4 extends upward and the other slot 5 extends downward from the hinge axis 14 of the lever block 2. The inner end points or roots 8 and 9 of the slots 4 and 5 form lines which are parallel to and are equidistant from the horizontal X–Y plane. Each slot 4 and 5 has a circular hole or bay 10, drilled at its root to provide stress relief.

A suitable material for the lever block is low carbon steel, such as SAE 1010, SAE 1020, or B1113 steel. Such material has a coefficient of expansion of 6.7 microinches per inch per degree Fahrenheit (that is $$6.7 \times 10^{-6}/ °F.$$

Each slot, 4 and 5, has two opposing faces such as face 16 (see FIG. 2). In the illustrated embodiment of this invention, two displacement sensors 20 and 21 (shown in FIG. 2 and FIG. 4 respectively) are utilized. One displacement sensor 20 is mounted on the upper surface 6 of the lever block 2 (see FIG. 2), which surface is also, in this embodiment, the surface most distant from the object 32 under consideration (see FIG. 3). The other displacement sensor 21 is mounted on the lower surface of the lever block (as shown in FIG. 4), which surface is, in this embodiment, the surface nearest the object 32 under consideration (see FIG. 3).

As shown in FIG. 6, each displacement sensor comprises a unitary member composed of a piezoresistive semiconductor material and having a short narrow neck 23 separating two enlarged pads 24 and 25. The electrical leads 28 and 29 are conductively bonded to the enlarged pads 24 and 25 respectively. The displacement sensors shown in this embodiment are described more fully in the copending application identified above.

The displacement sensors 20 and 21 are mounted across the outward extremities of the slots 4 and 5 respectively. In the illustrated embodiment, the displacement sensors are bonded to the lever block 2 by nonconductive cement. The enlarged pads 24 and 25 of each displacement sensor are attached to each of the members 12 and 13 of the lever block 2 as shown in FIG. 2.

Figure 4:
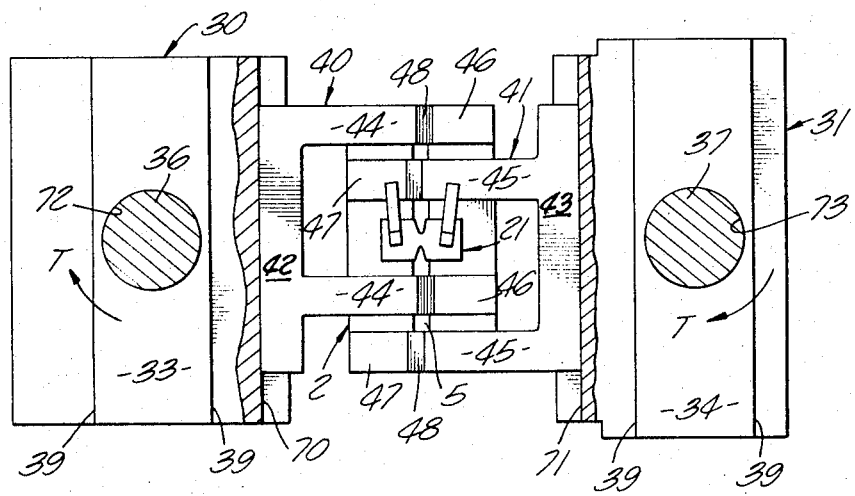
FIG. 4 is a partially cut-away bottom view of an embodiment of the strain gauge.

As shown in FIG. 3, the stanchions 30 and 31 are mounted upon the object under consideration 32 at the mounting surfaces 33 and 34. The stanchions 30 and 31 as shown in this embodiment are made of low carbon steel, which also has a coefficient of expansion of about 6.7 microinches per inch per degree Fahrenheit (that is $6.7 \times 10^{-6}/°F.$). The mounting may be accomplished either by the use of bolts 36 and 37 extending through each stanchion 30 and 31 respectively and screwed into the object 32 under consideration, or by applying glue to the mounting surfaces 33 and 34, or by a combination of both methods. The advantage of being able to bolt down the strain gauge is that there is little time delay compared with the time usually required to wait for mounting glue to dry.

In the illustrated embodiment, each stanchion 30 and 31 has two steps 39, adjacent the mounting surfaces 33 and 34. The mounting surfaces 33 and 34 are flat and coplanar.

In one embodiment of the invention, the summation length L was ¾ inch and the various parts had the proportions illustrated in the drawings. The stanchions had widths of 0.5 inch parallel to the X—X axis, heights of 0.40 inch parallel to the Z—Z axis and "lengths" of 0.30 and 0.38 inch respectively in the direction of the strain axis Y—Y. In this case, the foot between the two steps of each stanchion had a length of 0.168 inch along the strain axis Y—Y. With steps having heights of about 0.01", the feet have sufficient rigidity to facilitate the efficient transfer of strain to the springs 40 and 41 but but they are narrow enough to permit the strain gauge to return to its zero condition when the strain of the test object is removed.

Each stanchion 30 and 31 has a groove 70 and 71 respectively which receives the base member of the respective flexible spring 40 and 41. Each stanchion 30 and 31 in the embodiment shown also has a vertical hole 72 and 73 respectively to receive mounting bolts 36 and 37 respectively as shown in FIG. 3.

As shown in FIG. 4, each stanchion 30 and 31 is connected by a flexible spring 40 and 41 to the lower surface of the more distant member, 13 and 12 respectively, of the lever block 2. The flexible spring 40 is connected to member 13 of the lever block and the flexible spring 41 is connected to member 12.

Each of the flexible springs 40 and 41 is substantially flat and each spring 40 and 41 has a transverse or base member 42 and 43 respectively. Each spring 40 and 41 also has two longitudinal members or arms 44 and 45 respectively, which project in substantially the same direction from their respective base members 42 and 43. Each arm of each flexible spring has a finger member 46 and 47 extending in the direction of the arm but with the longitudinal axis of each said finger member being displaced from and substantially parallel to the longitudinal axis of the arm. In the embodiment shown, each finger is an integral part of its respective arm, its longitudinal axis being offset from the longitudinal axis of its respective arm by means of a bend 48 in each arm member of each flexible spring. The bend 48 is also shown in FIG. 1. The bend 48 in each arm in the embodiment shown prevents rubbing of an arm against the near member of the lever block. In FIG. 4, the arm members 44 would rub against the lower surface of member 12 of the lever block if there were no bends 48 separating the fingers 46 from the arms 44 unless spacing channels were cut in the ends of the blocks opposite the springs or other similar precautions were taken.

The base members of the flexible springs are mounted rigidly to the stanchions 30 and 31 by means of epoxy glue or they could be attached to the respective stanchions by welding.

The flexible springs may be constructed of 17-7 PH stainless steel. The spring steel may be bought in condition C (heavily work hardened) then heated to 900° F. to produce condition CH900. The flexible springs are formed by chemical etching and, if so formed as described above, the material will have a coefficient of expansion of about 6.1 microinches per inch per degree Fahrenheit ($6.1 \times 10^{-6}$/°F.). In the embodiment of the invention illustrated, the springs had a thickness of 15 mils; their arms had a length of 275 mils and a width of 50 mils and they were spaced 185 mils apart. The fingers had lengths of 90 mils and their lower surfaces were offset 15 mils from the arms so that the lower surfaces of the fingers were coplanar with upper surfaces of the arms.

Thus, as shown in FIG. 4, each flexible spring 40 and 41 has two relatively widely spaced arm members 44 and 45 respectively. These arm members are relatively widely spaced in order to provide rotational stability for each stanchion during the mounting of the strain gauge upon the object under consideration. The arms of the flexible springs are alternately positioned or interfitted, that is, one arm of each flexible spring extends between the two arms of the other flexible spring.

If the strain gauge is bolted onto the object under consideration, a rotational torque T as shown in FIG. 4 is applied to the mounting surface of each stanchion 33 and 34 (see FIG. 3) as the bolts 36 and 37 are tightened. This torque would more likely rotate the stanchion 30 or 31 relative to the lever block if it were not for the wide displacement of the two arms of each flexible spring and their resulting stiffness about the vertical or neutral axis Z—Z.

In FIG. 3 it can be seen that as the object 32 under consideration is subjected to tensile or compressive forces, the stanchions 30 and 31 move apart or together, respectively. This motion of the stanchions 30 and 31 is transmitted through the flexible springs 40 and 41 respectively, to the members 13 and 12 respectively, of the lever block 2.

When a tensile force is applied in the object under consideration 32, the two members 12 and 13 of the lever block tend to rotate in opposite directions about the hinge axis 14. The arrows A (see FIG. 3) show the direction of rotation in response to a tensile force. The opposing faces of the lower slot 5 of the lever block tend to move together, while the opposing faces of the upper slot 4 tend to separate. The lower displacement sensor 21 (not visible in the view of FIG. 3) on the lower surface of the lever block is thus put into compression while the upper displacement sensor 20 on the upper surface of the lever block is put into tension. In the case where piezoresistive semiconductive material of the type that has been employed is used in the displacement sensors, the displacement sensor 21 on the lower surface decreases in resistance while the displacement sensor 20 on the upper surface of the lever block increases in resistance.

On the other hand, when a compressive force is applied to the object 32 under consideration, the opposing faces of the lower slot 5 of the lever block 2 are urged apart and the opposing faces of the upper slot 4 are urged toward each other. The displacement sensor 21 on the lower surfaces of the lever block increases in resistance, while the displacement sensor 20 on the upper surfaces decreases in resistance.

In FIG. 1, the strain summation length (L) of the strain gauge is approximately the distance between the midpoints of the mounting surfaces 33 and 34 of the stanchions 30 and 31 respectively, and represents the total effective distance over which strain is summed by the strain gauge. The gauge length (G) of the displacement sensor 20 represent the distance over which the summed strain is measured by the piezoresistive displacement sensors. This gauge length (G) is the width of the slots 4 and 5. Since the total strain which is summed over the strain summing length L is measured across the much smaller gauge length G of the displacement sensors 20 and 21, a sensitivity multiplication factor M.F. of $$K \frac{L}{G}$$

is produced, where K is a fractional number representing the efficiency of the conversion of the strain from the strain summing length L to the gauge length G.

While this conversion efficiency K is low, being of the order of 0.10 (that is 10%), nevertheless the overall effectiveness of the device is so great, that steps are often taken to reduce the efficiency. The reduction of the conversion efficiency from 1.0 to a low value is caused in part by the bend in the springs in part by strain gradients in stanchions, and in part by the lever block and for other reasons. The efficiency is sometimes reduced by increasing the offset of the fingers 46 and 47 of the springs from the arms 44 and 45.

As shown in FIG. 2, the roots 8 and 9 of the slots 4 and 5 respectively, are separated by a relatively small distance $d$ as compared with the height of the lever block. The smaller the distance $d$, the less is the resistance offered by the lever block 2 to motion of the stanchions 30 and 31 relative to each other.

The displacement sensors 20 and 21 offer little resistance to motion of the stanchions 30 and 31 relative to each other largely because of their size and design. As disclosed in the above-identified copending application, the neck 23 of each displacement sensor is of smooth hour-glass configuration, with the narrowest portion of the neck having a cross-section of about 0.0002 cm.$^2$ The hour-glass configuration, of the embodiment shown in FIG. 6 tends to minimize the force necessary to stretch or compress the displacement sensors 20 and 21, since most of the deformation occurs at the narrowest portion, and the small cross-section allows a relatively small force to deform the displacement sensor.

Since the strain gauge as shown is driven full-scale by a force of about three pounds, the measurements of strain also tend to be more reliable than if a larger force were required to drive it full-scale, because slippage of the mounting surfaces 33 and 34 along the surface of the object under consideration 32 is reduced.

The design of the displacement sensors also contributes to the overall sensitivity of the strain gauge for another reason. It has been pointed out that a high sensitivity multiplication factor of $$K\frac{L}{G}$$

is achieved as a result of summing the strain over the distance L and measuring it over the gauge length G of the displacement sensors (see FIG. 1). Since the neck of each displacement sensor is of smooth hour-glass configuration, the strain is further concentrated in the narrowmost portion of the neck 23 of each displacement sensor, thereby further increasing the overall sensitivity to strain.

It is desirable in a strain gauge of this sort that the gauge be relatively insensitive to changes in the temperature of the immediate surroundings of the gauge. Otherwise the zero level, that is the output when no strain is applied, of the strain gauge tends to change with the temperature. This is due partly to strains developed in the parts of the strain gauge as the temperature changes because of the geometrical relationship. It has been found that in the particular structure described, the zero shift may be substantially entirely eliminated by choosing material for the flexible springs which has a slightly lower temperature coefficient of expansion than the steel parts 30, 31, and 2 of which the strain gauge is made and the steel objects on which the strain gauge is normally mounted. In particular in the specific structure described, when the stanchions 30 and 31 and the block 2 have been made of steel having a temperature coefficient of expansion of $6.7 \times 10^{-6}/°$ F., spring material having a temperature coefficient of expansion of $6.1 \times 10^{-6}/°$ F., has proved to be effective.

Figure 5:
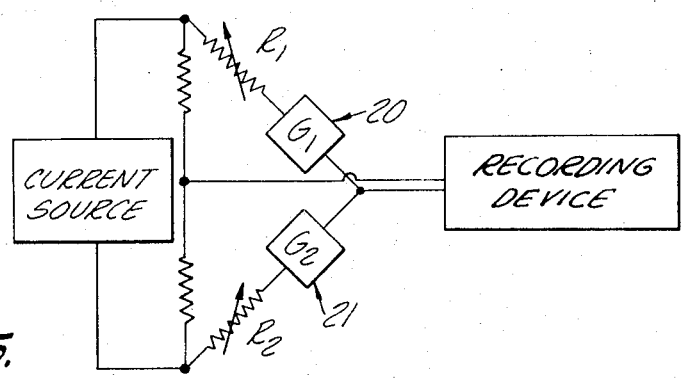
FIG. 5 is a schematic circuit and block diagram employed in an embodiment of the invention.

But even though the zero shift is eliminated in this way there still remains the problem of a change in the sensitivity of the piezoresistive elements 20 and 21 so that the ratio of proportionality of change in resistance to strain depends upon the temperature. Changes of this kind are rendered less significant by connecting the displacement sensors 20 and 21 in adjacent arms of a Wheatstone bridge in series with a respective resistor R1 and R2 in the corresponding arm of the bridge as illustrated, for example in FIG. 5. In the particular Wheatstone bridge a current source is connected across one diagonal and a recording device or other indicator is connected across the other diagonal. In a particular embodiment of the invention, the resistors R1 and R2 have had resistance values of about one-half that of the displacement sensors 20 and 21 and the resistors R1 and R2 were made of a material having a zero temperature coefficient of resistance. The resistors R1 and R2 are variable to facilitate setting the reading of the recorder at a desired value corresponding to zero strain. Other methods of setting the reading of the recorder at a point to correspond to zero strain may also be employed.

In the embodiment of the invention illustrated, the flexible springs 40 and 41 are rigid about the transverse axis Z—Z and about the strain axis Y—Y. But they are flexible about the axis X—X of rotation, thus making the gauges easy to handle, without damaging the delicate displacement sensors 20 and 21 mounted on the lever block 2. Without such springs the sensors could be easily broken.

FIG. 3 shows a cutaway view of the protective cover 50 for the strain gauge. The cover 50 is attached rigidly to one stanchion 30 and the cover 50 extends around the lever block 2 and is joined to the opposite stanchion 31 with a body 35 of an adhesive elastomer such as Dow Corning 271 silicone rubber cement or some other similar flexible weatherproof cement. The use of flexible cement to join the cover 50 to one of the stanchions 31 enables movement of the stanchions 30 and 31 relative to each other while at the same time providing a weatherproof seal protecting the interior of the strain gauge.

A closure plate 53 is attached rigidly to one stanchion 30 and to the side wall of the cover 50 by means of epoxy cement and is flexibly joined to the other stanchion 31 by means of the body 38 of flexible cement such as described above.

As shown in FIG. 1, each stanchion 30 and 31 has a respective relieved portion 55 and 57 to receive the protective covering 50. The relieved portion 57 of the stanchion 31 also provides the position at which the housing sections 50 and 53 are joined to the stanchion 31 by means of flexible cement 35 and 38 (see FIG. 3). In order to most easily facilitate mounting of the protective covering 50, the upper surface of the stanchion 30 is flat and coplanar with the upper surface of the relieved portion 57 of stanchion 31.

A multiple-conductor electrical cable 52 joins and extends through the protective cover 50 at the end at which the protective cover 50 is mounted rigidly to one of the stanchions 30. The electrical wires 54 connected to the displacement sensors 20 and 21 are not shown in FIG. 3 for purposes of clarity of the drawing.

This strain gauge is sensitive to tensile or compressive forces along the direction of strain, and also to bending forces. In the case of pure tensile and compressive forces, the flexible springs 40 and 41 are moved horizontally the same distance as the mounting surfaces of the stanchions. FIG. 7 is a schematic representation of an application of the invention when the strain gauge is mounted upon an object 32 which is being subjected to bending. Dimensions have been exaggerated for purposes of clarity. In the case of bending, as in FIG. 7, due to the fact that the flexible springs 40 and 41 are connected to the stanchions 30 and 31 respectively above the mounting surfaces 33 and 34, as the object under consideration 32 is subjected to bending forces around the axis of rotation X—X (see FIG. 1), the flexible springs move a distance different from that which the mounting surfaces move, causing an apparent linear multiplication of strain dependent on how far above the mounting surfaces 33 and 34 the flexible springs are located. This causes an improper recordation of strain which may be corrected since the distance above the mounting surfaces 33 and 34 at which the flexible springs 40 and 41 are mounted is known. Assuming that the flexible springs 40 and 41 are mounted a distance $h$ (see FIG. 7) above the mounting surfaces 33 and 34 and assuming that there is a linear multiplication of bending strain, the actual strain $E_a$ can be determined from the indicated strain $E_i$ as follows:

$$E_a = E_i \left( \frac{T}{T+2h} \right)$$

where T is the thickness of the object under consideration subjected to pure bending only. In one embodiment in which $h$ was equal to $\tfrac{1}{16}$ inch, the formula became:

$$E_a = E_i \left( \frac{T}{T+\tfrac{1}{8}} \right)$$

It will be understood that this invention is not limited to the details of the embodiment illustrated, but that many variations may be made therein as will now appear to those skilled in the art with the principles of this invention. More particularly, it will be understood that the lever block may be made in different configurations and different proportions, and may be composed of different materials from those specifically disclosed herein. Additionally, it will be understood that many of the advantages of this invention may be obtained by the use of a different number of displacement senors. It will be also understood that the motion of the opposing faces of each slot may be detected with other types of displacement sensors while still obtaining some of the advantages of the invention. For example, wire strain gauge elements under tension may be bridged across the slots, or, if desired, electrically polarized piezoelectric elements sensitive to strain may be mounted within the slots and cemented to the faces thereof.

While the invention has been described in its preferred embodiment in which the stanchions are bolted to an object under test, it will be understood that the strain gauge may also be monuted in place by adhesives such as glue or epoxy cement. This kind of mounting is advantageous where it is objectionable to drill and tap the object upon which the strain gauge is mounted.

It is thus seen that the invention provides an improved strain gauge which is very sensitive to micro strains and which needs no electrical amplification, which may be easily handled and easily installed and which is reliable in operational use.

The invention claimed is:

1. In a strain gauge:
two stanchions rigidly attachable to an object under consideration,
two flexible springs each having a cross member and two relatively widely spaced arms projecting in the same direction from the cross member,
each of said arms having a finger extending in the direction of the arm, the longitudinal axis of said finger being displaced from and substantially parallel to the longitudinal axis of the arm,
the cross member of each flexible spring being rigidly connected to a respective stanchion,
a slotted lever block comprising two block members hingedly connected and separated by two opposed slots and adapted to move in opposite directions about a hinge axis adjacent the root of said slots,
said two slots extending outwardly from said hinge axis,
said slotted lever block being located between said two stanchions,
the surface nearest the object under consideration of each said two block members being affixed to the two fingers of the flexible spring connected to the stanchion most distant from said each member to the said slotted lever block,
a displacement sensor extending across each slot,
the ends of each said displacement sensor being attached to the two said block members respectively and being responsive to relative motion of said two block members.

2. A strain gauge as defined in claim 1 wherein the arms of the respective flexible springs are spaced apart but are alternately positioned.

3. A strain gauge as defined in claim 1 wherein each of said displacement sensors comprise a unitary member composed of a piezoresistive semiconductor material and having a short narrow neck separating two enlarged pads:
said enlarged pads being connected to the said two members of the lever block, and
electrical leads conductively bonded to the pads on opposite sides of said neck.

4. A strain gauge as defined in claim 3 wherein said block is composed of metal and said sensors are secured to and insulated from said block by means of insulating adhesive material.

5. A strain gauge as defined in claim 1 in which a protective covering is rigidly attached to one stanchion and is flexibly joined to the other stanchion by means of a weatherproof seal.

6. A strain gauge as defined in claim 4 in which a protective covering is rigidly attached to one stanchion and is flexibly joined to the other stanchion and in which cables extend through the protective covering and are conductively connected to said electrical leads.

7. A strain gauge as defined in claim 1 wherein said two stanchions have two substantially coplanar mounting faces that lie in a plane parallel to said hinge axis.

8. In a strain gauge:
two support members,
a slotted flexure member comprising two lever members hingedly interconnected and adapted to rotate in opposite directions about a hinge axis,
said flexure member being located between said two support members along a line parallel to a strain axis and with said hinge axis extending transversely of said direction,
two springs resiliently connecting each of the respective lever members to the respective support members,
said springs being rigid in the direction of the strain axis but being flexible about said strain axis, and
a displacement sensor coupling the lever members and being responsive to movement of one lever member relative to the other lever member.

9. A strain gauge as defined in claim 8 wherein the displacement sensor comprise a unitary member composed of a piezoresistive semiconductor material and having a short narrow neck separating two enlarged pads.

10. A strain gauge as defined in claim 8 wherein said slotted flexure member is of rectangular configuration, having two coplanar slots having roots adjacent the hinge axis and extending away from said hinge axis in a plane normal to said strain axis.

11. In a strain gauge:
two support members,
two flexible springs, each having a cross member and two relatively widely spaced arms projecting in the same direction from the cross member,
the cross member of each flexible spring being rigidly connected to a respective support member,
a flexure member comprising two wing members mounted for rotation in opposite directions about a flexure axis,
each of said two wing members being affixed to the two arms of the respective flexible springs, and
a displacement sensor coupling the two wing members and being responsive to motion of one said wing member relative to the other said wing member.

12. In a strain gauge:
two support members separated by a first distance,
a flexure member comprising two wing members mounted for rotation in opposite directions about a flexure axis, each of said wing members being connected to a respective support member by a spring which is rigid along its longitudinal axis but flexible in a transverse direction, a slot having a root adjacent to the said flexure axis and extending away from the flexure axis and separating the two wing members by a second distance, said first distance being substantially larger than said second distance, a displacement sensor connected to said two wing members across said slot, the ends of said displacement sensor being rigidly connected to the said wing members respectively and responsive to motion of one wing member relative to the other.

13. A strain gauge as defined in claim 12 wherein said displacement sensor is mounted across the outward extremity of said slot.

14. A system for measuring the displacement occurring between two positions comprising:

two support members rigidly attachable respectively to said two positions, two flexible springs each having a cross member and two relatively widely spaced apart arms projecting in the same direction from the cross member, the cross member of each flexible spring being connected to a respective support member, a slotted lever block comprising two block members hingedly connected and separated by a slot and adapted to rotate in opposite directions about a hinge axis, said slot extending away from said hinge axis adjacent the root of said slot, each of said two block members of said slotted lever block being affixed to the two arms, respectively, of the respective flexible spring, a displacement sensor extending across the outward extremity of said slot, the ends of each said displacement sensor being attached to the two said block members of the slotted lever block respectively and being responsive to motion of one member of the slotted lever block relative to the other member of said block.

References Cited

UNITED STATES PATENTS

| | | | |
|---|---|---|---|
| 2,775,887 | 1/1957 | Hines. | |
| 3,004,231 | 10/1961 | Laimins | 338—5 |
| 3,261,204 | 7/1966 | Jacobson. | |
| 3,315,202 | 4/1967 | Johns et al. | 338—5 |
| 3,315,203 | 4/1967 | Jacobson | 338—5 |
| 3,351,880 | 11/1967 | Wilner | 338—6 |

REUBEN EPSTEIN, *Primary Examiner.*

U.S. Cl. X.R.

73—88.5